Feb. 3, 1925.

H. J. KREBS

UNIVERSAL INDICATOR

Filed Jan. 8, 1923

Inventor
Henry J. Krebs
By Lancaster and Allwine
Attorneys

Feb. 3. 1925. 1,524,980
H. J. KREBS
UNIVERSAL INDICATOR
Filed Jan. 8, 1923 2 Sheets-Sheet 2

Inventor
Henry J. Krebs.
By Lancaster and Allwine
Attorneys

Patented Feb. 3, 1925.

1,524,980

UNITED STATES PATENT OFFICE.

HENRY JOSEPH KREBS, OF DAYTON, OHIO.

UNIVERSAL INDICATOR.

Application filed January 8, 1923. Serial No. 611,465.

*To all whom it may concern:*

Be it known that I, HENRY J. KREBS, a citizen of the United States, residing at Dayton, in the county of Montgomery and State of Ohio, have invented certain new and useful Improvements in Universal Indicators, of which the following is a specification.

This invention relates to an improved center indicator.

The primary object of this invention is the provision of a rotary indicator which may be used in connection with metal working machines to effect a centering operation, or to determine the correctness of a boring or milling operation upon a piece of work.

A further and important object of this invention is the provision of a center indicator, including certain novel characteristics whereby the same may be attached to a metal working machine, and read during rotation thereof, and whereby the proper centering of the tool holding element of the machine with respect to work may be determined.

A further object of this invention is the provision of an indicator for determining the correctness of a centering or metal working operation, being supported by the ordinary tool holding chuck, so that the reading may be determined, while the indicator is rotating at a speed which is the same as the speed which the tool normally travels when performing a metal working operation.

A further object of this invention is the provision of a novel rotary center indicator, which is very accurate in gauging, economical in construction, and of compact and durable arrangement.

Other objects and advantages of this invention will be apparent during the course of the following detailed description.

In the drawings, forming a part of this specification, and wherein similar reference characters designate corresponding parts throughout the several views.

Figure 1:
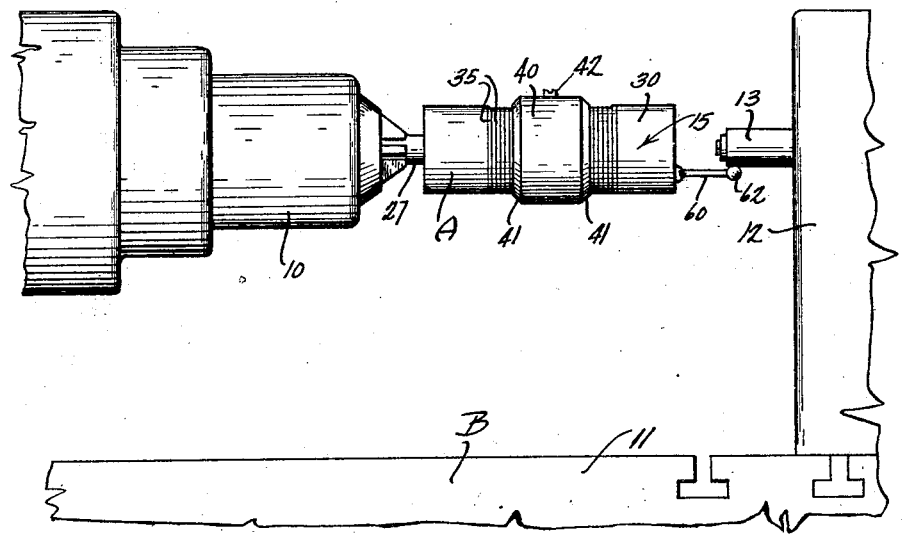
Figure 1 is a side elevation of a milling machine, showing the manner in which the improved indicator is used in connection therewith to determine the correctness of the centering of a piece of work to be operated upon.

In the drawings, wherein for the purpose of illustration is shown but the preferred embodiment of this invention, the letter A generally designates the improved gauge, which may be used in connection with a metal working machine B, such as a milling machine or lathe, to effect a centering operation, or to determine the correctness of a boring or milling operation.

The machine B may include the tool holding chuck 10, and a bed 11, upon which a piece of work 12 is attached in the conventional manner, and which has a button 13 thereon to be centered with respect to the chuck 10 to effect a boring or milling operation upon the work. In this connection, the improved indicator A is to be attached to the chuck 10 for rotation therewith, and cooperates with the work 12 so that the chuck may be adjusted with respect to the work to perform the desired operation with precision.

Referring to the improved indicator A, the same includes a supporting frame or body 15; and indicator mechanism 16.

Figure 2:
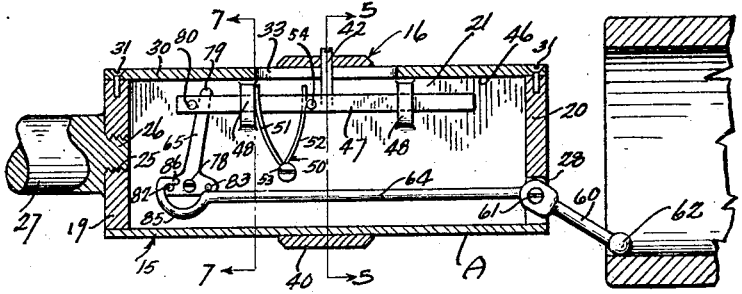
Figure 2 is a fragmentary longitudinal cross sectional view, taken through the improved indicator, showing interior details thereof, and showing the use of the same for gauging inside dimensions of a piece of work.
Figure 7:
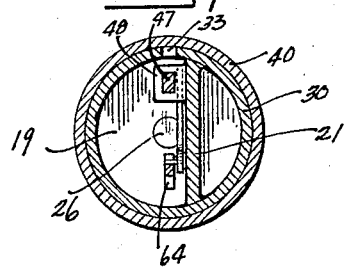
Figure 7 is a cross sectional view, taken substantially on the line 7—7 of Figure 2.
Figure 3:
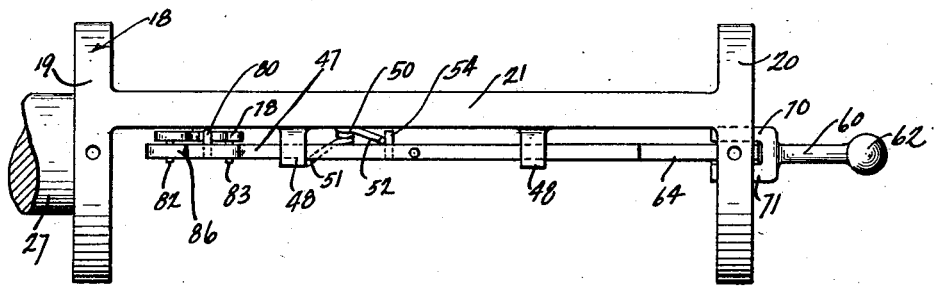
Figure 3 is a fragmentary plan view of details of this invention.
Figure 4:
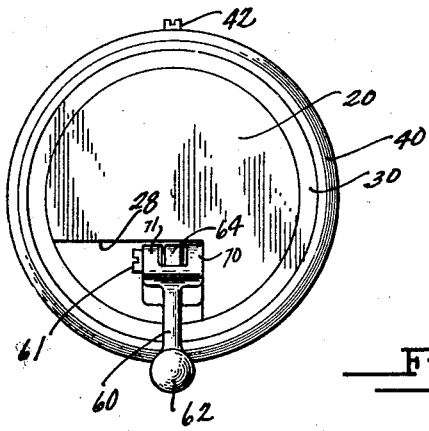
Figure 4 is an end elevation of the improved indicator.
Figure 5:
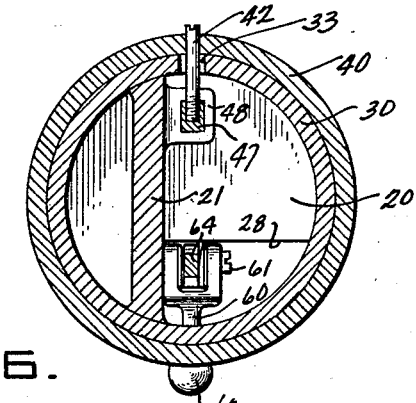
Figure 5 is a transverse cross sectional view, taken substantially on the line 5—5 of Figure 2.
Figure 6:
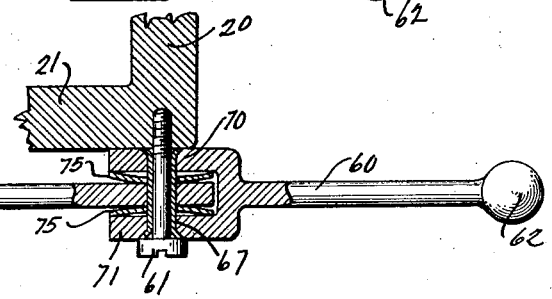
Figure 6 is an enlarged fragmentary cross sectional view, showing an adjusting arrangement of the improved indicator.

The supporting body 15 includes the frame 18, providing the end discs 19 and 20 connected in spaced parallel relation as by means of a plate portion 21, integrally formed with the end discs 19 and 20 and extending in a plane substantially at right angles to the discs and positioned slightly to one side of the axis of the body. The disc 19 is preferably provided with an axial screw threaded opening 25 for detachably receiving a screw threaded reduced shank 26 of a chuck gripping stem 27, which is preferably solid and cylindrical in formation and adapted for engagement by the fingers of the chuck 10, as is illustrated in Figure 1 of the drawings. In lieu of the member 27, a polygonal shaped extension may be provided of any approved formation, for disposition in tool posts and like machine parts. The other disc 20 is preferably provided with an opening 28 therein, through which a portion of the indicator mechanism 16 extends, as will be subsequently described. A cylindrical casing portion 30 is provided as a part of the supporting body 15, which is open at its ends, and adapted for detachable connection to the discs 19 and 20 as by screw elements 31, substantially as is illustrated in Figure 2 of the drawings. This cylindrical casing 30 is provided with a longitudinal slot 33 therein, intermediate its ends, and has a series of circumferential or peripheral grooves 35 engraved or otherwise disposed in the outer surface thereof, provided as graduations and delineations for cooperation with the indicator mechanism 16, as will be subsequently described.

Referring to the indicator mechanism 16, the same includes a sleeve member 40 of hollow cylindrical formation adapted for sliding longitudinally over the cylindrical casing 30 of the supporting structure 15. This sleeve 40 has the end marginal edges 41 thereof bevelled, to readily determine the position of said marginal edges with respect to the delineations or grooves 35 of the casing 30. A guide pin or screw 42 is preferably radially disposed through the sleeve 40 and extends into the slot 33 of the casing 30, as to prevent liability of rotational movement of the sleeve upon the casing 30, although permitting longitudinal movement thereon. Within the compartment 46 of the casing 30 the pin 42 supports a slide bar 47, which bears within lugs 48 formed integral upon the plate 21, so that upon movement of the sleeve 40, the bar 47 will be shifted longitudinally upon said frame plate 21, and upon movement of the bar 47 the sleeve will be moved. It is to be noted that a V-shaped coil spring 50 is provided, having leg portions 51 and 52 extending outwardly therefrom. The coil of this spring 50 is preferably attached to the frame plate 21 as by a screw 53, so that the leg 51 engages one lug 48, while the opposite leg 52 engages a pin 54 extending laterally of the plane of the bar 47 in facing relation toward the frame plate 21. Thus, the slide bar 47 is normally urged toward the disc end 20 of the supporting body 15, and consequently the indicator sleeve 40 is normally positioned midway the length of the body as is illustrated in Figure 1 of the drawings, as to expose certain graduations 35 at each end of said indicator sleeve.

A feeler arm 60 is pivotally supported by a detachable screw or pin member 61, at the end disc 20, as to extend outwardly of the compartment 46; said feeler arm having a counter weight or ball head 62 on the free end thereof for engagement with certain cylindrical surfaces of work to be centered or the like. A relatively long lever arm 64 is also pivoted to the pin 61, and extends rearwardly within the compartment 46 of the supporting body, in parallel relation to the frame plate 21, engaging at its inner end a rocker or control arm 65, as will be subsequently described; it being the purpose of the rocker arm to effect movement of the slide bar 47.

Referring to the adjustable connection of the feeler arm 60 with the lever arm 64 in such manner as to provide for proper operation of the indicator mechanism, a bushing 67 is provided upon the pivot screw or pin 61, being flared at the ends thereof, and adjacent which ends the spaced portions 70 and 71 of the bifurcated pivot end of the feeler arm 60 are pivoted. Upon the bushing 67, intermediate the portions 70 and 71 of the feeler arm 60, the lever 64 is pivoted. Between the facing surfaces of the pivot end of the lever 64 and the inside surfaces of the feeler arm ends 70 and 71, suitable spring washers 75 are provided, which are normally under compression to frictionally bind the feeler arm and lever arm for mutual pivot action. During rotational movement of the improved center indicator A, a relative adjustment of the feeler and lever arms 60 and 64 respectively will not be destroyed, although the same may be relatively manually adjusted so that the feeler arm 60 may be set to accord with the surface of a piece of work to be centered or gauged.

The rocker arm 65 is preferably pivoted, as by screw 78 upon the frame plate 21, so that the upstanding finger end 79 thereof engages a lateral pin 80 on the slide bar 47. At the lower end, on opposite sides of the pivot pin 78, the rocker arm 65 is provided with laterally extending pins 82 and 83. These pins are engaged by the free end of the lever arm 64; said lever arm engaging the pin 83 below said pin, while the extreme free end 85 of the lever arm 64 is downwardly arcuate and provides an upper inwardly extending finger 86 adapted for engagement above the other pin 82.

Referring to the operation of the improved gauge A, the same as used in connection with the milling machine B is carried by the chuck 10, as to extend axially of the chuck, and the feeler arm 60 is adjusted so that the ball end thereof engages the surface of the work to be altered and centered with respect to the screw holding chuck. Upon operation of the milling machine, the center gauge A will be rotated with the chuck 10, and any variance of the surface of the work engaged by the ball end of the feeler arm 60 will cause a rocking of the lever arm 64 so that the arm or finger 65 will be rocked for longitudinal sliding of the bar 47. This will, of course, cause a movement of the indicator sleeve 40 exteriorly upon the casing 30, and as the graduations 35 are distinctly visible during rotation of the center indicator, the longitudinal movement of the center indicator sleeve 40 upon the cylindrical casing 30 can be minutely noted. A very slight movement of the feeler arm will be exaggerated by the indicator mechanism, as to cause a much greater movement of the sleeve 40. Thus a discrepancy of .001 of an inch will generally move the indicator sleeve one sixteenth of an inch longitudinally of the casing 30, and which is of course, visibly detected by the operator. It is apparent that, upon movement of the feeler arm 60, in either direction above or below the normal centering surface, the lever arm 64 will be pivotally moved so that the rocker finger or arm 65 will be rocked in but one direction to engage the pin 80 of slide bar 47, so that the indicator sleeve 40 will be moved to designate a discrepancy in the proper centering of the tool chuck with respect to the work.

From the foregoing description of this invention, it will be apparent to those skilled in the art to which this invention pertains, that a center gauge has been provided which is able to effect a proper centering or gauging operation during rotation of the center indicator, and which is desirable, in view of the fact that the indicator may be read when being rotated with the tool chuck at the same speed at which the cutting tool rotates during a boring operation. The importance of providing an indicator of this type is primarily due to the fact that the oil film in which the tool spindle rotates is evenly distributed during rotation of the spindle and an exact reading may be had. However, if the machine is stopped to obtain a reading, with the ordinary stationary indicator, the tool spindle settles somewhat, forcing the oil above the same, which places the axis of the spindle somewhat below the normal running axis.

Various changes in the shape, size and arrangement of parts may be made to the form of the invention herein shown and described, without departing from the spirit of the invention or the scope of the claims.

I claim:

1. A center gauge comprising a supporting body having peripheral graduations thereon, a sleeve slidable longitudinally over the body having end marginal edges thereof bevelled for cooperating with said peripheral graduations, means for normally positioning said sleeve midway the length of the portion of the body having the graduations thereon, a feeler arm extending outwardly of the supporting body, and means connecting said feeler arm and said sleeve whereby the latter may be moved upon movement of the feeler arm for designating graduations on said body.

2. A center indicator, comprising a body having gage machinings provided thereon, a movable indicator slidable along said body for cooperating with the gage machinings and operating means for the indicator including a rocker arm pivotally mounted at one end and having side arms at its pivoted end, abutments extending from said side arms, a feeler pivotally mounted at one end to said body, a lever arm extending from the pivoted end of said feeler and having swinging movement towards and away from the pivoted end of the rocker arm when the feeler moves, said lever extending beneath one of the abutments and having its free end portion curved downwardly beneath the second abutment and extending upwardly at a point beyond the second abutment and terminating in a finger portion extending in overhanging relation to the second abutment.

3. A center indicator comprising a cylindrical casing having a longitudinally extending slot and transverse gage markings, a body plate in said casing, disks carried by said body plate adjacent the ends of said body, one of said disks being provided with a passage, a mounting member carried by the other disk, a sleeve slidable upon said casing and cooperating with the gage markings, a bar slidably carried by said body plate and having a pin extending through the slot and engaging said sleeve, a feeler extending through the passage of the first disk, and operating means between the feeler and bar.

HENRY JOSEPH KREBS.